(12) United States Patent
McCormick et al.

(10) Patent No.: US 6,378,665 B1
(45) Date of Patent: Apr. 30, 2002

(54) PAD RETRACTION SPRING FOR DISC BRAKE ASSEMBLY

(75) Inventors: Christopher O. McCormick, Novi; Charles Giacomazza, Royal Oak; Brad R. Lethorn, Novi; Daniel P. Schneider, Plymouth, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/607,725

(22) Filed: Jun. 30, 2000

(51) Int. Cl.⁷ ............................................. F16D 55/22
(52) U.S. Cl. ................................. 188/72.3; 188/73.38
(58) Field of Search ........................... 188/71.1, 73.35, 188/1.11 W, 72.3, 73.31, 73.36, 73.37, 73.38, 71.7

(56) References Cited

U.S. PATENT DOCUMENTS

| | | |
|---|---|---|
| 4,364,455 A | 12/1982 | Oshima |
| 4,491,204 A | 1/1985 | Dirauf et al. |
| 4,629,037 A | 12/1986 | Madzgalla et al. |
| 4,658,938 A | 4/1987 | Thiel et al. |
| 4,867,280 A | 9/1989 | Von Gruenberg et al. |
| 4,940,119 A | 7/1990 | Kondo et al. |
| 5,069,313 A | 12/1991 | Kato et al. |
| 5,249,647 A | 10/1993 | Kobayashi et al. |
| 5,251,727 A | 10/1993 | Loeffler et al. |
| 5,511,638 A * | 4/1996 | Tsuruta .................... 188/73.38 |
| 5,535,856 A | 7/1996 | McCormick et al. |
| 5,538,103 A * | 7/1996 | Rueckert et al. ........... 188/72.3 |
| 5,549,181 A | 8/1996 | Evans |
| 5,934,417 A * | 8/1999 | Kobayashi et al. ........ 188/72.3 |

* cited by examiner

Primary Examiner—Christopher P. Schwartz
Assistant Examiner—Melanie Torres
(74) Attorney, Agent, or Firm—MacMillan, Sobanski & Todd, LLC

(57) ABSTRACT

This invention relates to a pad retraction spring for use in a disc brake assembly. The pad retraction spring is operative to move the friction pads from engagement with the rotor when the friction pads are in a non-braking position. The pad retraction spring is effective to apply a first force against the friction pads when the friction pads are new, and effective to apply a second force against the friction pads when the friction pads are worn. The second force is greater than the first force, and at least one of the first force and the second force by itself is not sufficient to move at least one of the friction pads from engagement with the rotor when the friction pads are in the non-braking condition.

21 Claims, 14 Drawing Sheets

PAD RETRACTION SPRING FOR DISC BRAKE ASSEMBLY

BACKGROUND OF THE INVENTION

This invention relates in general to vehicle disc brake assemblies and in particular to an improved structure for a brake shoe retraction mechanism adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefor are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this, the disc brake assembly further includes a caliper assembly for selectively moving the brake shoes into frictional engagement with the rotor. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the inboard leg of the caliper adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the rotor. Because the caliper is slidably mounted on the pins of the anchor bracket, the outboard leg of the caliper (and, thus, the outboard brake shoe disposed adjacent thereto) are urged inwardly toward the outer side of the rotor. As result, the brake shoes frictionally engage the opposed sides of the rotor.

Frequently, an annular roll-back seal is provided within the cylindrical recess in contact with the outer surface of the piston. The roll-back seal is conventional in the art and performs several functions. First, the roll-back seal provides a seal to define the extent of the cylindrical recess within which the piston is disposed. Second, the roll-back seal is designed to retract the piston inwardly away from the rotor by a predetermined distance from the fully engaged position when the brake pedal is released after being depressed. To accomplish this, the roll-back seal frictionally engages the outer surface of the piston, resiliently resisting movement thereof when the brake pedal is depressed. Thus, when the brake pedal is released by the operator of the vehicle, the resilience of the roll-back seal causes the piston to retract within the cylindrical recess and out of contact with the inboard brake shoe.

With repeated usage, the friction pads of the brake shoes wear and become increasingly thinner. When this occurs, the piston and the caliper must move greater distances relative to one another to effect the same braking action as when the friction pads were new. Despite this increased distance of movement of the piston in the outboard direction, it is desirable that the roll-back seal retract the piston only by the same predetermined distance away from the rotor in the inboard direction. Thus, known roll-back seals are designed to accommodate increased movement of the piston in the outboard direction when the brake pedal is depressed, but to retract the piston inwardly by approximately the same predetermined distance when the brake pedal is subsequently released.

Ideally, when the brake pedal is released, the brake shoes should also be spread apart from one another to prevent any incidental frictional engagement with the rotor. To accomplish this, it is known to provide the disc brake assembly with one or more retraction springs for moving the brake shoes apart from one another to prevent frictional engagement with the rotor when the brake pedal is released. For example, U.S. Pat. No. 4,364,455 to Oshima, al., U.S. Pat. No. 4,491,204 to Dirauf et al., U.S. Pat. No. 4,629,037 to Madzgalla et al., U.S. Pat. No. 4,658,938 to Thiel et al, U.S. Pat. No. 4,867,280 to Von Gruenberg et al., U.S. Pat. No. 4,940,119 to Kondo et al., U.S. Pat. No. 5,069,313 to Kato et al., U.S. Pat. No. 5,249,647 to Kobayashi et al., and U.S. Pat. No. 5,251,727 to Loeffler et al. all disclose disc brake assemblies which include a retraction spring structure. It is desirable that such retraction springs exert an amount of force which is large enough to urge the brake shoes apart from one another to prevent engagement with the rotor, but small enough not to overcome the roll-back seal to move the piston deeper within the associated cylindrical recess formed in the inboard leg of the caliper.

Unfortunately, when the friction pads of the brake shoes wear thinner as described above, conventional retraction springs are compressed to a greater extent when the friction pads of the brake shoes are worn than when they are new. The additional compression of known retraction springs can result in the exertion of a force against the brake shoe which can overcome the roll-back seal and undesirably move the piston away from the rotor by a distance which is greater than the predetermined distance discussed above.

SUMMARY OF THE INVENTION

This invention relates to an improved pad retraction spring adapted for use in a disc brake assembly. The disc brake assembly includes an anchor bracket adapted to be secured to a vehicle component, a brake caliper adapted to be secured to the anchor bracket, a pair of friction pads carried by the disc brake assembly and adapted to be disposed on opposite axial sides of an associated brake rotor, and actuation means for selectively moving the friction pads into frictional engagement with the rotor. The pad retraction spring is carried by the disc brake assembly and is operative to move the friction pads from engagement with the rotor when the friction pads are in a non-braking position. The pad retraction spring is effective to apply a first force against the friction pads when the friction pads are new, and effective to apply a second force against the friction pads when the friction pads are worn. The second force is greater than the first force, and at least one of the first force and the second first force by itself is not sufficient to move at least one of the friction pads from engagement with the rotor when the friction pads are in the non-braking condition.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
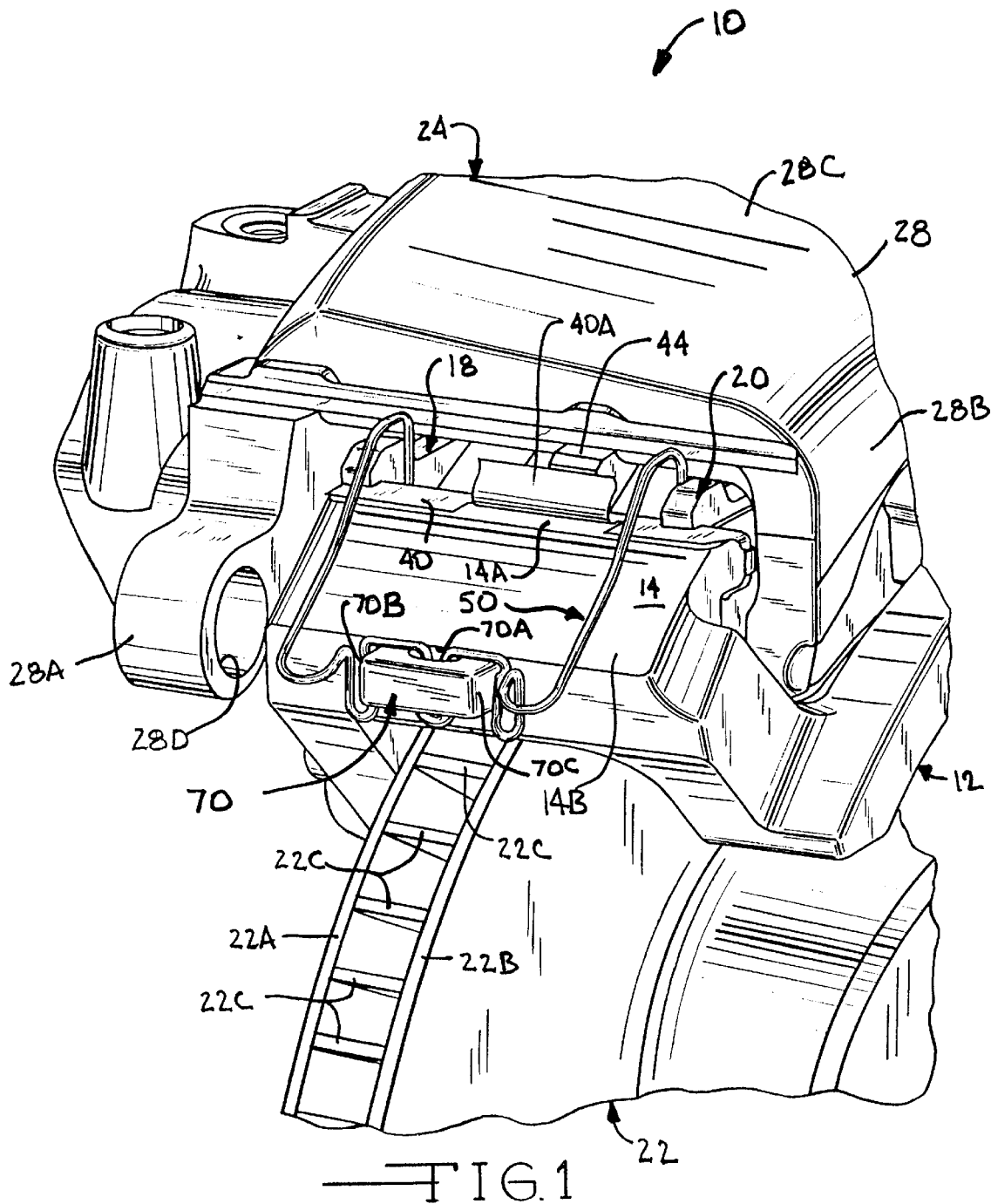
FIG. 1 is a perspective view of a portion of a vehicle disc brake assembly including a first embodiment of a pad retraction spring in accordance with this invention.

Referring now to the drawings, there is illustrated in FIGS. 1 through 7 a portion of a vehicle disc brake assembly, indicated generally at 10, including a first embodiment of a pad retraction spring, indicated generally at 50, in accordance with the present invention. The general structure and operation of the vehicle disc brake assembly 10 is conventional in the art. Thus, only those portions of the vehicle disc brake assembly 10 which are necessary for a full understanding of this invention will be explained and illustrated. Although this invention will be described and illustrated in conjunction with the particular vehicle disc brake assembly disclosed herein, it will be appreciated that this invention may be used in conjunction with other vehicle disc brake assemblies.

The vehicle disc brake assembly 10 includes an anchor bracket 12 which is adapted to be secured to a fixed, non-rotatable component of the vehicle. Such a fixed, non-rotatable vehicle component can be, for example, an axle flange (not shown), when the disc brake assembly 10 is installed for use on the rear of the vehicle, or a steering knuckle (not shown), when the disc brake assembly 10 is installed for use on the front of the vehicle. To accomplish this, the anchor bracket 12 is provided with a pair of threaded apertures 12A (only one of such apertures 12A being illustrated in FIG. 4), formed therethrough. A pair of threaded bolts (not shown) extend through associated non-threaded apertures (not shown) provided in the non-rotatable vehicle component and are threadably received in the threaded apertures 12A of the anchor bracket 12. In the illustrated embodiment, the anchor bracket 12 further includes a pair of blind holes (not shown) which as will be discussed below, are adapted to receive associated slide pins to slidably support a brake caliper relative thereto.

The anchor bracket 12 includes a pair of outwardly extending arms 14 and 16. The arms 14 and 16 have respective upstanding guide rails 14A and 16A formed thereon. The guide rails 14A and 16A extend transverse to the arms 14 and 16 and extend parallel to one another. A pair of brake shoes 18 and 20 are supported on the guide rails 14A and 1 6A of the anchor bracket 12 for sliding movement relative thereto. The inboard brake shoe 18 includes a backing plate 18A having a friction pad 18B secured thereto. Similarly, the outboard brake shoe 20 includes a backing plate 20A having a friction pad 20B secured thereto.

Figure 3:
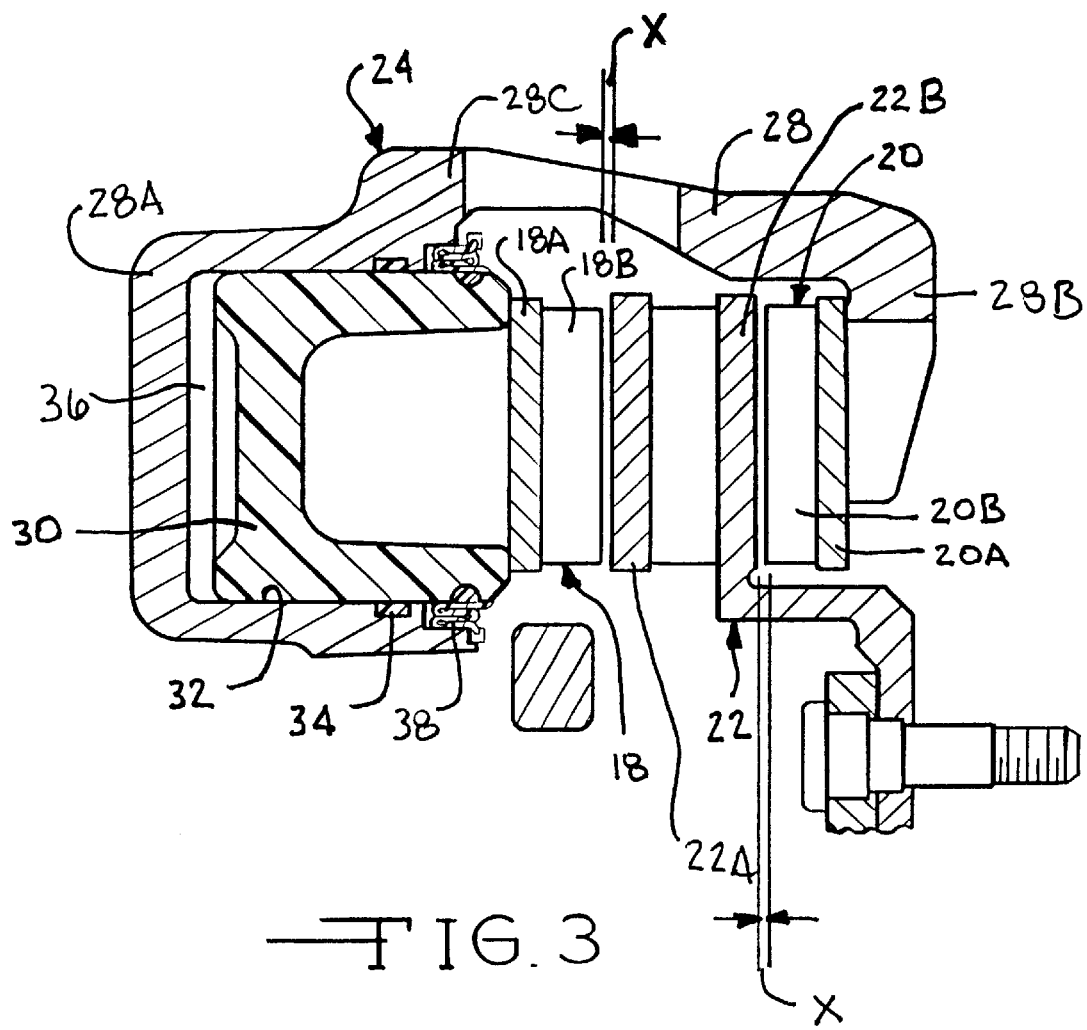
FIG. 3 is a sectional view taken along line 3—3 of FIG. 2.
Figure 4:
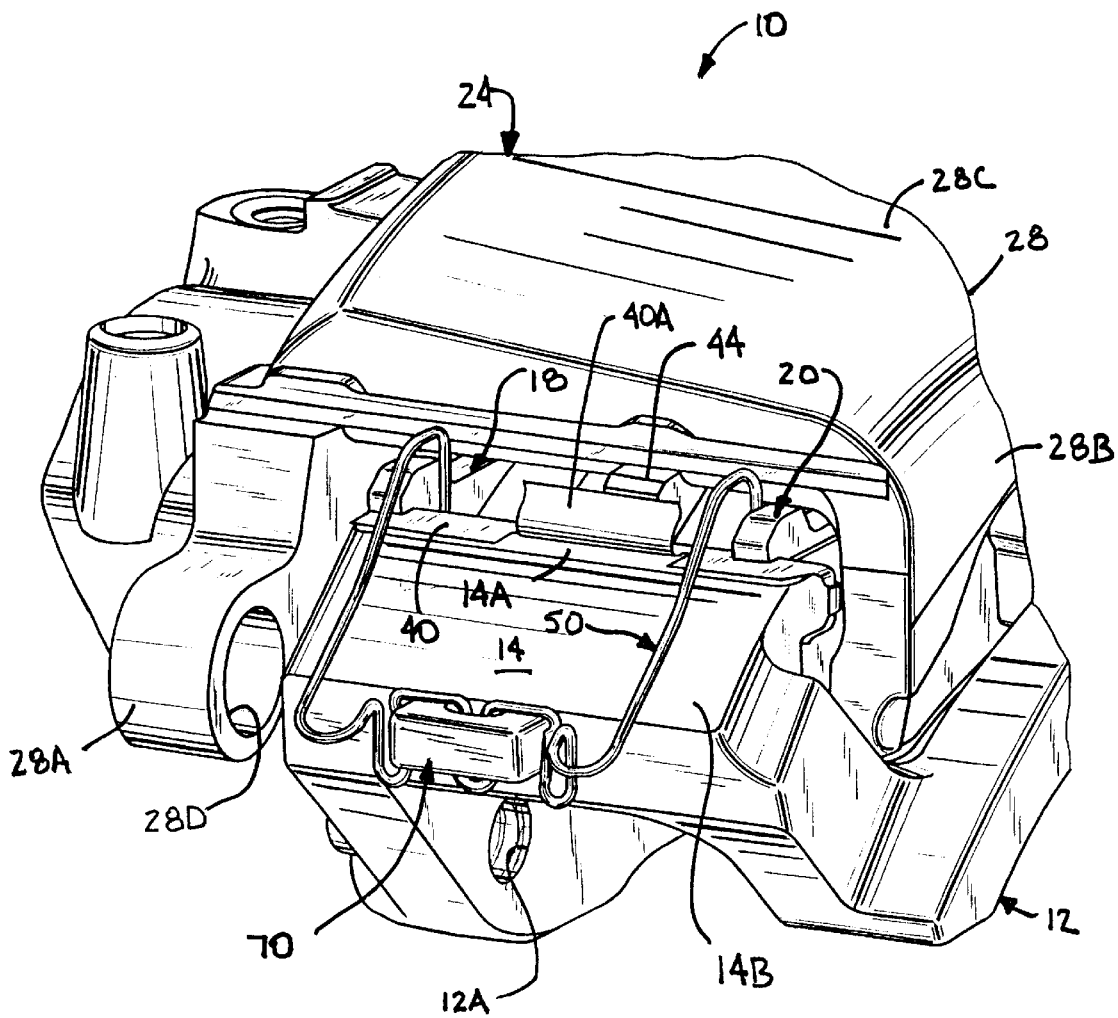
FIG. 4 is another view of the vehicle disc brake assembly illustrated in FIG. 1 with the brake rotor not being shown.
Figure 5:
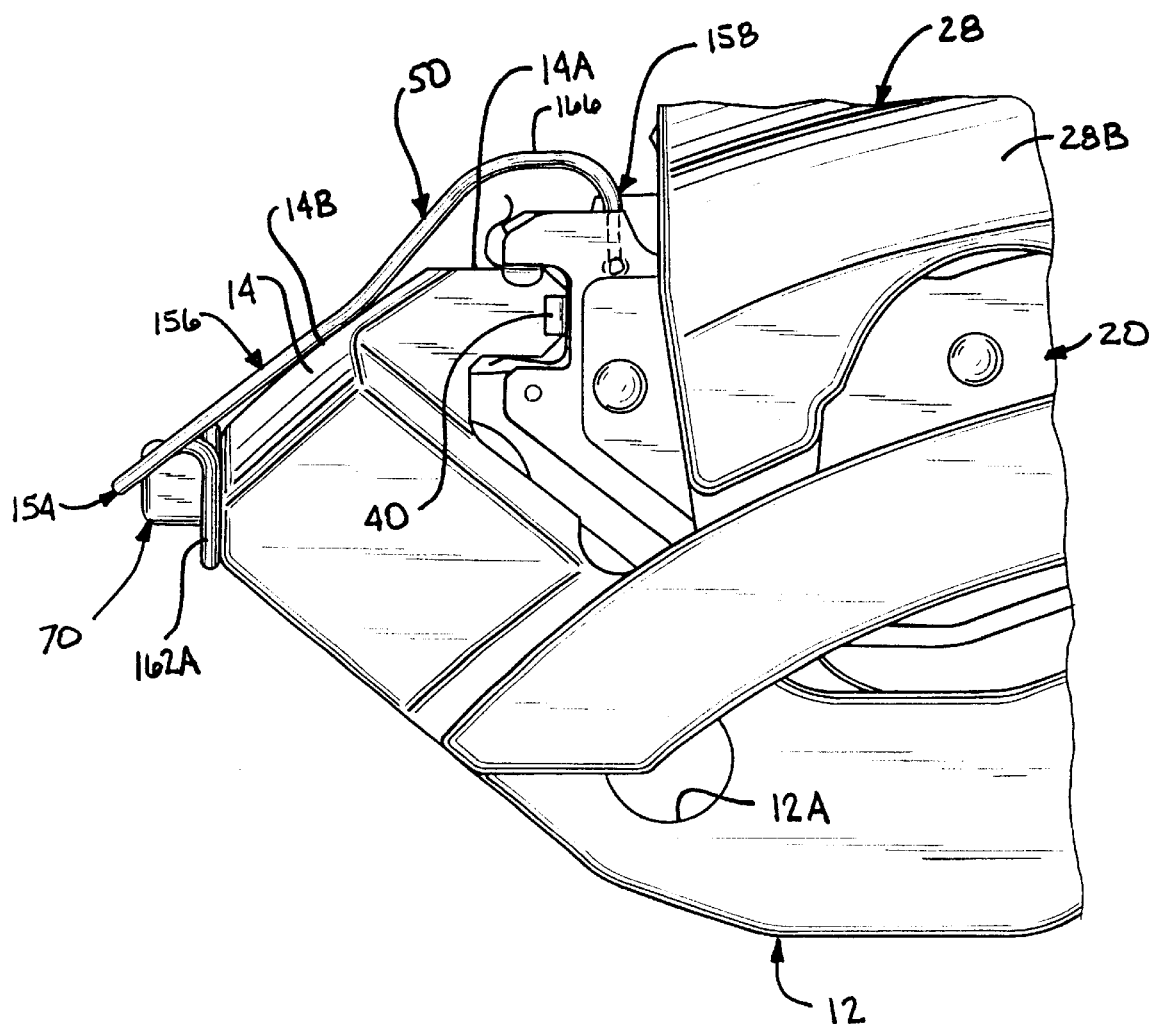
FIG. 5 is another view of the vehicle disc brake assembly illustrated in FIG. 1 including the first embodiment of the pad retraction spring.
Figure 6:
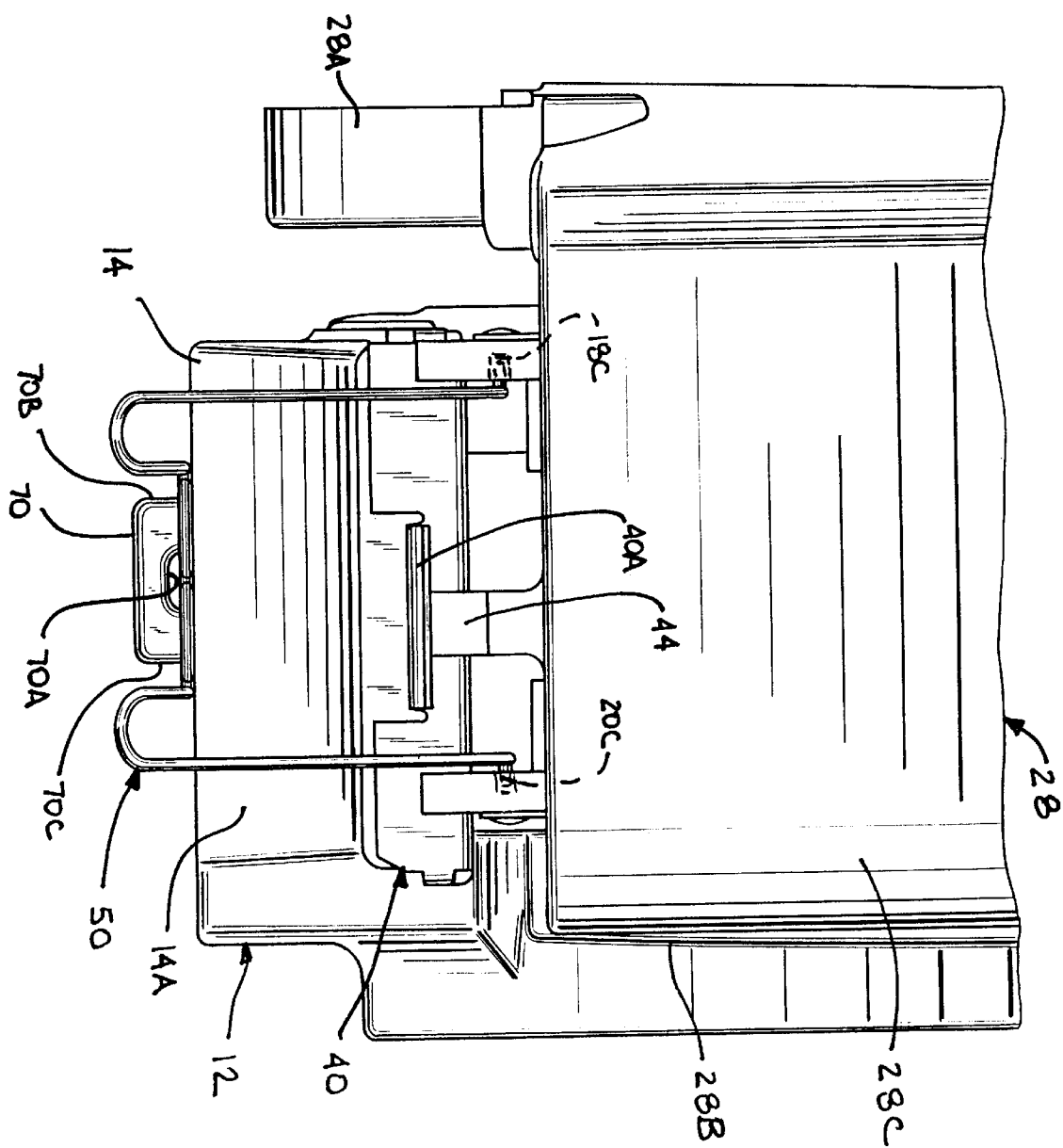
FIG. 6 is another view of the vehicle disc brake assembly illustrated in FIG. 1 including the first embodiment of the pad retraction spring.
Figure 7:
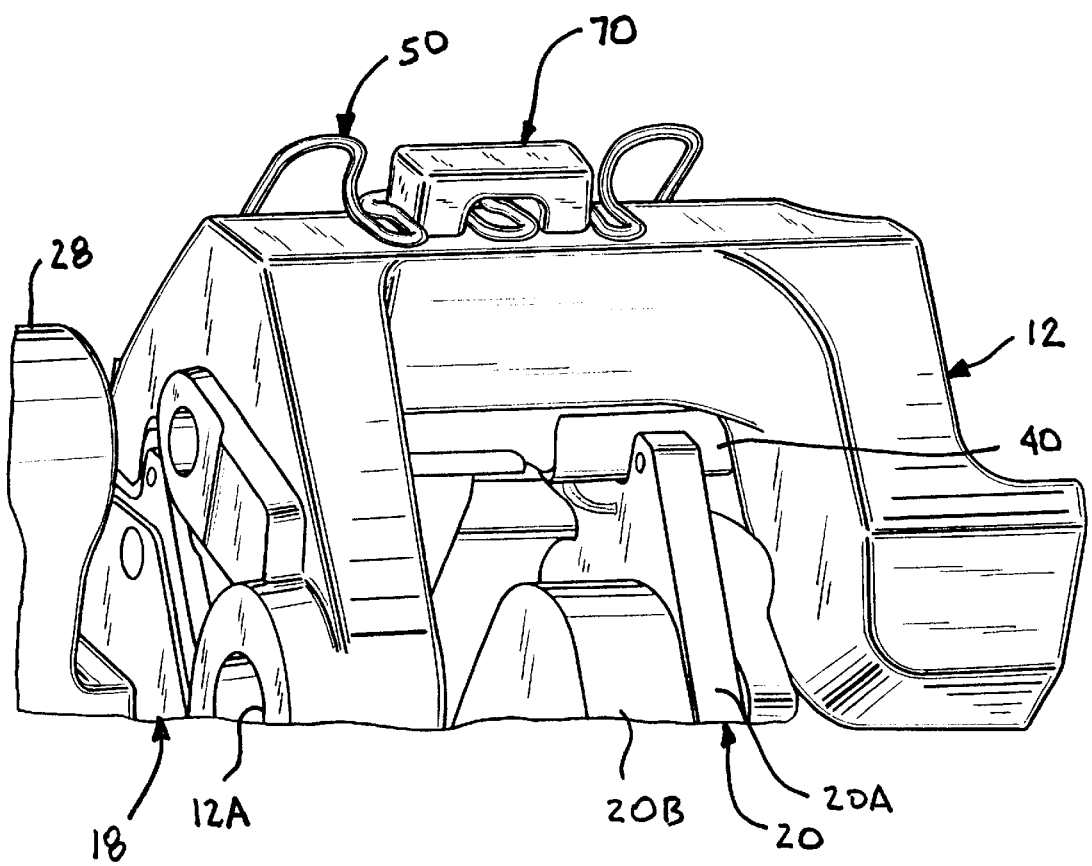
FIG. 7 is another view of the vehicle disc brake assembly illustrated in FIG. 1 including the first embodiment of the pad retraction spring.
Figure 8:
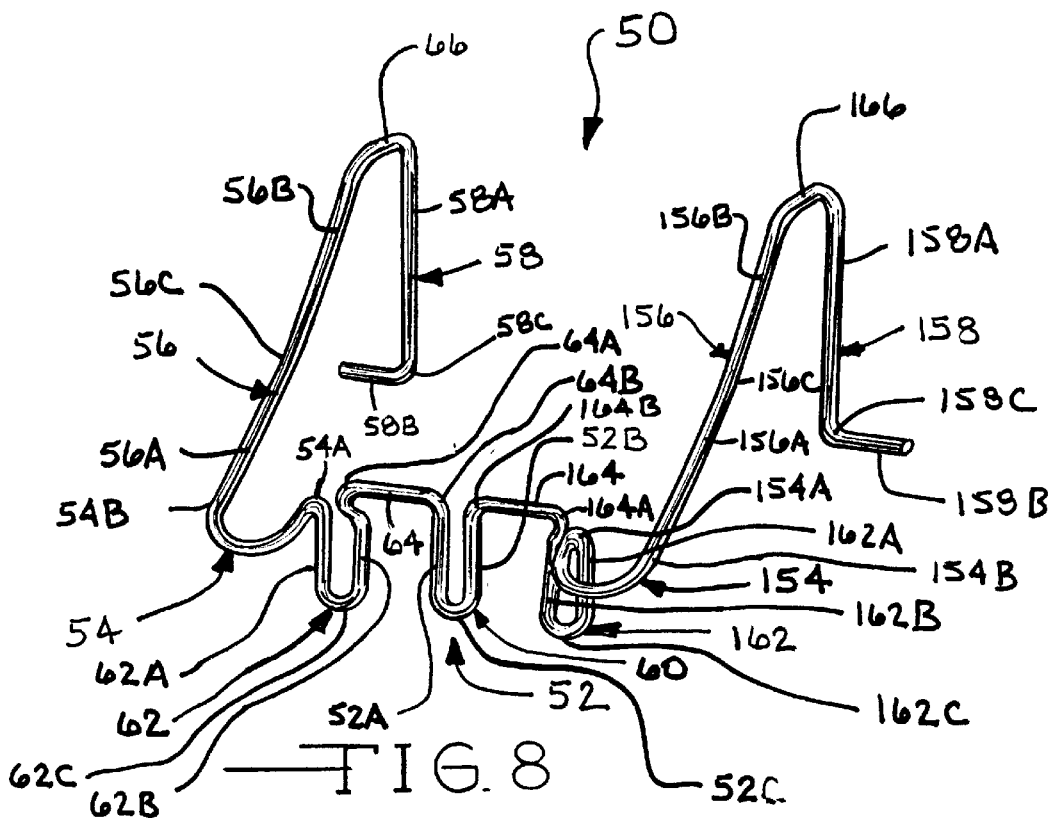
FIG. 8 is a perspective view of the first embodiment of the pad retraction spring illustrated in FIGS. 1, 2, and 4–7.

As best shown in FIG. 3, the brake shoes 18 and 20 are disposed on opposite sides of a brake rotor 22. The brake rotor 22 is generally flat and circular in shape and is secured in a conventional manner to a rotatable wheel (not shown) of the vehicle. As shown in FIG. 1, the illustrated brake rotor 22 includes a pair of opposed braking discs 22A and 22B which are spaced apart from one another by a plurality of intermediate vanes 22C in a known manner.

To effect braking action of the associated vehicle wheel, means are provided for selectively moving the brake shoes 18 and 20 inwardly toward one another so as to frictionally engage the opposed sides of the brake rotor 22. In the illustrated embodiment, this means for selectively moving the brake shoes 18 and 20 includes a disc brake caliper assembly, indicated generally at 24.

The disc brake caliper assembly 24 includes a brake caliper 28 which is supported on a pair of slide pins (not shown) for sliding movement relative to the anchor bracket 12. The slide pins extend through a respective aperture 28D formed in the brake caliper and outboard ends of the slide pins are received in the blind holes (not shown) provided in the anchor bracket 12. The brake caliper 28 is generally C-shaped and includes an inboard leg 28A disposed adjacent the inboard brake shoe 18, an outboard leg 28B disposed adjacent to the outboard brake shoe 20, and an intermediate bridge portion 28C connecting the inboard leg 28A to the outboard leg 28B. The slide pins permit the brake caliper 28 to slide in both the outboard direction (right when viewing FIG. 3) and the inboard direction (left when viewing FIG. 3).

Such sliding movement of the brake caliper 28 occurs when the disc brake assembly 10 is actuated, as will be explained below.

Means are provided for actuating the disc brake assembly 10 so as to selectively move the brake shoes 18 and 20 into frictional engagement with the rotor 22. In the illustrated embodiment, as shown in FIG. 3, the actuating means includes a brake piston 30 which is disposed in a cylindrical recess 32 formed in the outboard facing surface of the inboard leg 28A of the caliper 28. A fluid seal 34 is disposed in an annular groove formed in the side wall of the cylindrical recess 32 and engages the outer side wall of the brake piston 30. The fluid seal 34 is provided to define a sealed hydraulic actuator chamber 36, within which the brake piston 30 is disposed for sliding movement. Also, the fluid seal 34 is designed to function as a roll-back seal which retracts the brake piston 30 within the cylindrical recess 32 when the disc brake assembly 10 is not actuated and pressure is removed. Thus, it will be appreciated that the illustrated actuating means is a hydraulic actuating means. However, other well known types of actuating means, such as pneumatic, electrical, and mechanical, can be used. A dust boot seal 38 is provided about the outboard end of the brake piston 30 to prevent water, dirt, and other contaminants from entering into the cylindrical recess 32. The dust boot seal 38 is formed from a flexible material and has a first end which engages the piston 30 and a second end which engages the inboard leg 28A of the brake caliper 28. A plurality of flexible convolutions are provided in the dust boot seal 3 8 between the first and second ends thereof to accommodate movement of the brake piston 30 relative to the inboard leg 28A of the brake caliper 28.

When it is desired to actuate the disc brake assembly 10 to retard or stop the rotation of the brake rotor 22 and the vehicle wheel associated therewith, the driver of the vehicle depresses a brake pedal (not shown). In a manner which is well known in the art, the depression of the brake pedal causes pressurized hydraulic fluid to be introduced into the chamber 36. Such pressurized hydraulic fluid urges the brake piston 30 in the outboard direction (toward the right when viewing FIG. 3) into engagement with the inboard brake shoe 18. As a result, the friction pad 18B of the inboard brake shoe 18 is moved into frictional engagement with the inboard braking disc 22A of the brake rotor 22. At the same time, the brake caliper 28 slides on the slide pins in the inboard direction (toward the left when viewing FIG. 3) such that the outboard leg 28B thereof moves the friction pad 20B of the outboard brake shoe 20 into frictional engagement with the outboard braking disc 22B of the brake rotor 22. As a result, the brake rotor 22 is frictionally engaged by the friction pads 18B and 20B of the brake shoes 18 and 20, respectively, to retard relative rotational movement thereof. Alternatively, the inboard backing shoe 18 can be supported on the piston 30, while the outboard backing shoe 20 can be supported on the outboard leg portion 28B of the caliper 28. In the illustrated embodiment, the disc brake assembly 10 further includes a pair of clips 40 and 42 which are disposed on the guide rails 14A and 16A, respectively, of the disc brake assembly. The clips 40 and 42 include respective spring arms 40A and 42A which capture an associated lift arm or stop 44 provided on the underside of the bridge portion 28C of the brake caliper 28 so as to bias the brake caliper 28 downwardly toward the guide rails 14 and 16 of the anchor bracket 12. Alternatively, the clips 40 and 42 could also receive a portion of the brake shoes 18 and 20 so as to bias the shoes upwardly or downwardly away from or toward the guide rails 14 and 16 of the anchor bracket 12 to prevent rattling of the shoes.

Figure 2:
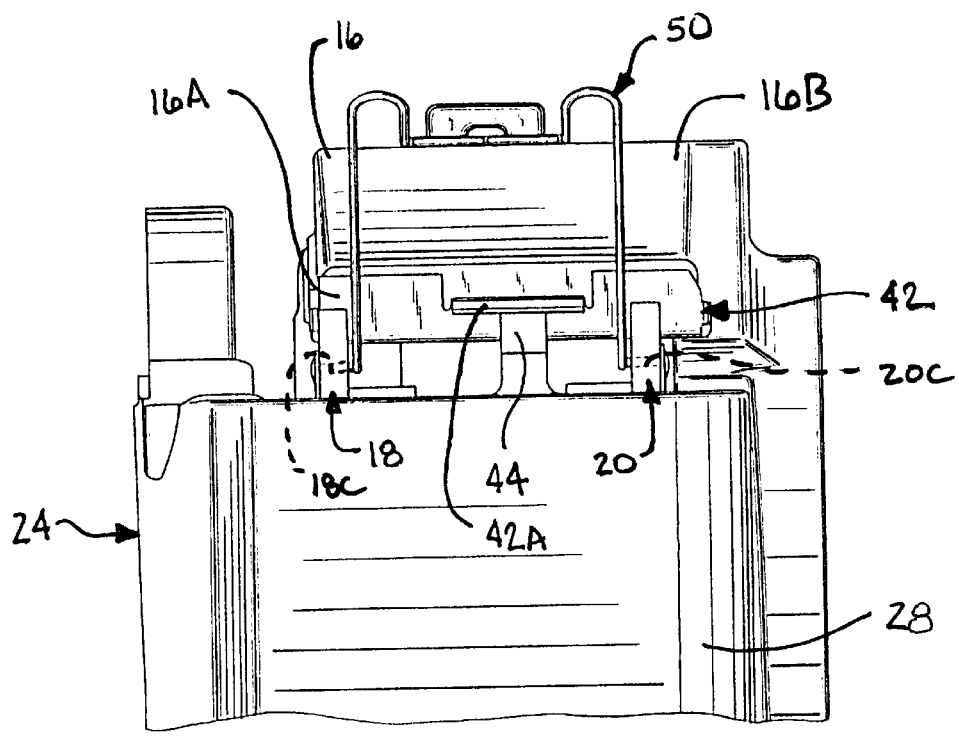
FIG. 2 is another view of the vehicle disc brake assembly illustrated in FIG. 1 with a pair of the first embodiment of the pad retraction springs being shown and the brake rotor not being shown.
Figure 2:
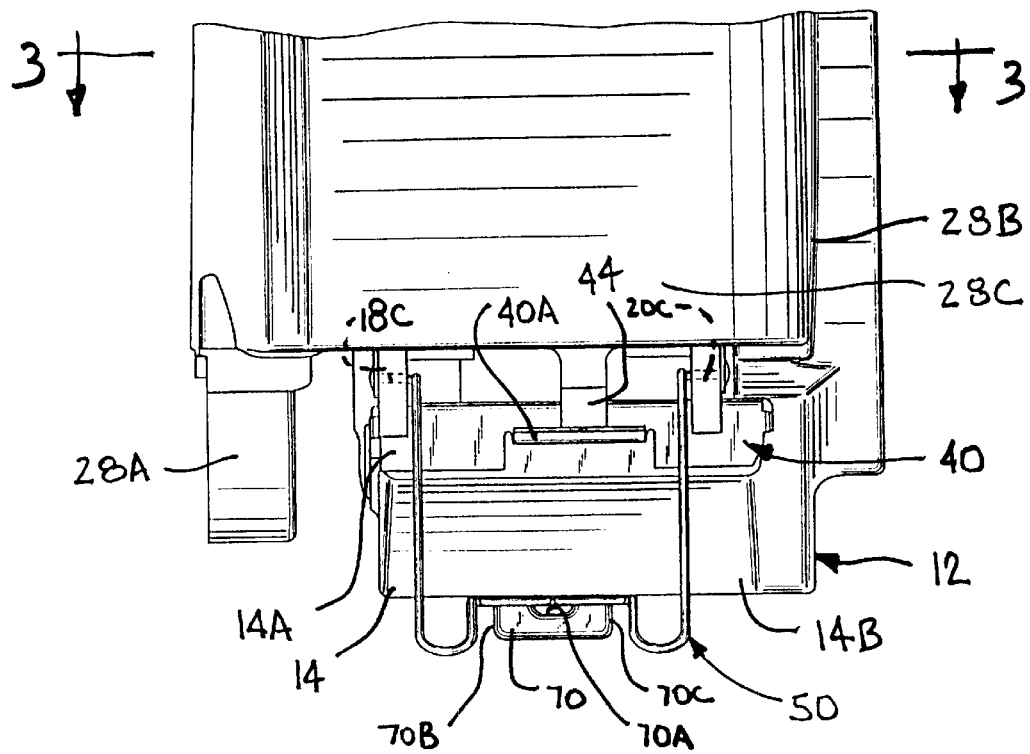

The disc brake assembly 10 further includes a pad retraction mechanism which is operative to apply a force to urge the brake shoes 18 and 20 apart from one another to prevent engagement with the rotor 22 when the brake pedal is released. The retraction mechanism preferably includes a pair of retractor springs 50 which, as best shown in FIG. 2 are disposed on opposite sides of the brake caliper 28 and in particular, which are disposed on the arms 14 and 16 of the anchor bracket 12. In the illustrated embodiment, the retractor springs 50 are identical in structure and operation, although such is not required. Each retractor spring 50 is preferably formed from a round band of stainless steel. More preferably, the spring 50 is formed from 2 mm stainless steel. However, other materials, such as for example, plastics and other metals, and other forms, such as for example, plate springs, wire with square and rectangular cross sections, can be used.

In the illustrated embodiment, each of the retractor springs 50 is formed having a central mounting portion, indicated generally at 52, a first pair of spring arms 54 and 154, a second pair of spring arms 56 and 156, and a third pair of spring arms 58 and 158. The central mounting portion 52 includes a central mounting portion 60 and a pair of end mounting portions 62 and 162. The central mounting portion 52 is generally U-shaped and includes a pair of generally straight portions 52A and 52B which are connected together by a curved portion 52C. The end mounting portion 62 is generally U-shaped and includes a pair of generally straight portions 62A and 62B which are connected together by a curved portion 62C. The central mounting portion 52 and the end mounting 62 are connected together by a generally straight portion 64 having curved ends 64A and 64B. The end mounting portion 162 is generally U-shaped and includes a pair of generally straight portions 162A and 162B which are connected together by a curved portion 162C. The central mounting portion 52 and the end mounting 162 are connected together by a generally straight portion 164 having curved ends 164A and 164B.

In the illustrated embodiment, the spring arm 54 is generally U-shaped and is connected to the end mounting portion 62 via a curved portion 54A and to the spring arm 56 via a curve portion 54B. The spring arm 56 includes a generally straight first portion 56A and a generally straight second portion 56B which are interconnected by a curved intermediate or transition portion 56C. The spring arm 58 is generally L-shaped and includes a generally straight portion 58A and a generally straight portion 58B which are interconnected by a curved transition portion 58C. The spring arm 56 is connected to the spring arm 58 by a transition portion 66. The end of the portion 58B of the spring arm 58 defines an attachment finger of the spring 50.

In the illustrated embodiment, the spring arm 154 is generally U-shaped and is connected to the end mounting portion 162 via a curved portion 154A and to the spring arm 156 via a curved portion 154B. The spring arm 156 includes a generally straight first portion 156A and a generally second straight portion 156B which are interconnected by a curved intermediate or transition portion 156C. The spring arm 158 is generally L-shaped and includes a generally straight portion 158A and a generally straight portion 158B which are interconnected by a curved transition portion 158C. The spring arm 156 is connected to the spring arm 158 by a transition portion 166. The end of the portion 158B of the spring arm 158 defines an attachment finger of the spring 50.

In the illustrated embodiment, the springs 50 are respectively supported on and secured to the arms 14 and 16 of the anchor bracket 12. To accomplish this, a lug or protrusion 70 is provided on each of the arms 14 and 16 in a predetermined position located relative to the position of the rotor 22. The lug 70 is provided with an aperture 70A sized to receive the central portion 60 of the spring 50, and the straight portions 62B and 162B of the respective end portions 62 and 162 are biased against associated sides 70B and 70C of the lug 70 so as to support and secure the spring 50 to the anchor bracket 12 in a fixed position. Also, as shown in this embodiment, a portion of the arms 56 and 156 of the spring 50 may contact a portion of an adjacent angled surface 14B and 16B of the arms 14 and 16, respectively, of the anchor bracket 12.

As shown in FIG. 2, the attachment fingers 58B of the arms 58 of each of the springs 50 is disposed in an aperture 18C (shown in phantom) formed the backing plate 18A of the inboard brake shoe 18, and the attachment fingers 158B of the arms 158 of each of the springs 50 is disposed in an aperture 20C (shown in phantom) formed the backing plate 20A of the outboard brake shoe 20. Thus, when the springs 50 are installed on the disc brake assembly 10 as shown in FIGS. 1, 2, and 4–7, each of the springs 50 engages and applies forces to both the inboard brake shoe 18 and the outboard brake shoe 20 to urge them apart from one another to prevent engagement with the rotor 22.

Specifically, the pad retraction springs 50 are operative to evenly divide the amount of piston roll back in order to maintain a predetermined clearance, indicated as X in FIG. 3, between the brake shoes 18 and 20 and the associated braking discs 22A and 22B of the brake rotor 22 when pressure to the disc brake assembly 10 is subsequently released. For example, a typical roll back of a brake piston 30 by a seal 34 can be in the range of about 0.010 to 0.015 inch, resulting in a predetermined clearance X which is in the range of about 0.005 to 0.007 inch. However, as will be discussed, the forces exerted by the pad retraction springs 50 are not sufficient to overcome the roll-back seal 34 to move the brake piston 30 deeper within the cylindrical recess 32 formed in the inboard leg 28A of the brake caliper 28, as discussed above. Alternatively, the springs 50 can be configured so as to provide a different force to each of the brake shoes 18 and 20 if so desired.

As mentioned above, the friction pads 18B and 20B of the brake shoes 18 and 20, respectively, wear and become increasingly thinner with repeated usage of the disc brake assembly 10. When this occurs, the brake shoes 18 and 20 must move closer toward one another when the brake pedal is depressed in order to frictionally engage the brake rotor 22. Notwithstanding this, the pad retraction springs 50 are effective to apply only a slightly greater magnitude of force against the brake shoes 18 and 20 to spread them apart from one another and move them away from the rotor 22 as they exerted when the friction pads 18 and 20 were not worn. To accomplish this, the pad retraction springs 50 have a predetermined spring rate. For example, the pad retraction springs 50 can have a preferred spring rate which is in the range from about 0.40 N/mm to about 0.70 N/mm. More preferably, the pad retraction springs 50 can have a spring rate of about 0.55 N/mm. Thus, in a vehicle application having a pair of pad retraction springs 50 having a spring rate of 0.55 N/mm, the springs 50 are operative to apply a force of about 11.8 newtons against the opposed ends of the brake shoes 18 and 20 when the pads 18B and 20B are new. As the pads 18B and 20B wear thinner (around 12 mm of total wear for each pad 18B and 20B), the springs 50 are operative to apply a force of about 18.4 newtons against the opposed ends of the brake shoes 18 and 20. Another example is a pad retraction spring 50 having a spring rate of 0.55 N/mm is operative to apply a force of about 13.6 newtons against the opposed ends of the brake shoes 18 and 20 when the pads 18B and 20B are new and as the pads 18B and 20B wear thinner (around 12 mm of total wear for each pad 18B and 20B), the springs 50 are operative to apply a force of about 20.2 newtons against the opposed ends of the brake shoes 18 and 20. Alternatively, the spring rate of the springs 50 can be other than described above if so desired. It should be noted that the force of the springs 50 is preferably lower than a force that would overcome the roll back seal 34 and move the brake piston 30 within the recess 32. Such a force necessary to overcome the roll back seal 34 would be around generally be at least around 100 newtons or greater. In addition, the force of the springs 50 is preferably not sufficient by itself to move the brake shoes 18 and 20 apart from one another to prevent engagement with the rotor 22 when the brake pedal is released. However, the springs 50 in combination with the movement of the vehicle and/or other brake components is effective to allow the springs 50 to bias the shoes 18 and 20 apart from one another to prevent engagement with the rotor 22. However, in a brake application having a low sliding resistance of the brake shoes 18 and 20 on the associated guide rails 14 and 16 and depending upon the particular configuration of the springs 50, the springs 50 by themselves could apply a force sufficient to bias the shoes 18 and 20 apart from one another from engagement with the rotor 22 when the brake pedal is released. Also, in accordance with this invention, the spring force exerted solely by the springs 50 can be effective to move only one of the brake shoes, for example, the inboard brake shoe 18 away from engagement with the brake rotor 22 since this does not require the need to move the brake caliper 28; however, the spring force exerted solely by the springs 50 would not be effective to move the other one of the brake shoes, such as for example, the outboard brake shoe 20 away from engagement with the rotor 22 since this requires movement of the brake caliper 28. Thus, in accordance with this invention, even after substantial wear of the friction pads 18B and 20B has occurred and the pad retraction springs 50 apply an increasing force, the pad retraction springs 50 exert a relatively low force against the brake shoes 18 and 20. As a result, the forces exerted by the pad retraction springs 50 remain sufficient to move the brake shoes 18 and 20 apart from one another from engagement with the rotor 22 by the predetermined clearance X, but insufficient to overcome the roll-back seal 34 to move the brake piston 30 deeper within the cylindrical recess 32 formed in the inboard leg 28A of the brake caliper 28, as discussed above.

Figure 9:
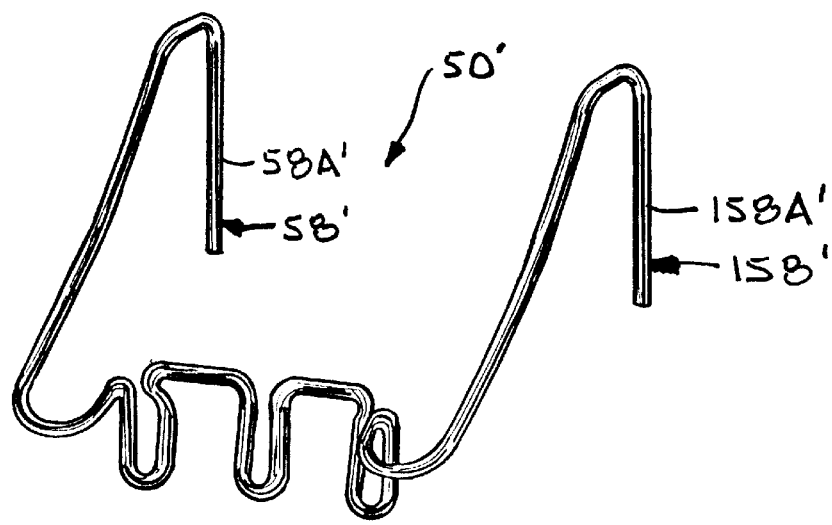
FIG. 9 is a perspective view of a second embodiment of a pad retraction spring in accordance with the present invention.

Turning now to FIG. 9 and using like reference numbers to indicate corresponding parts, there is illustrated a second embodiment of a pad retraction spring 50' in accordance with the present invention. In this embodiment, the third spring arm 58' and 158' includes only a generally straight first portion 58A' and 158A', respectively, which is disposed adjacent the associated backing plate 18A and 20A of the brake shoes 18 and 20.

Figure 10:
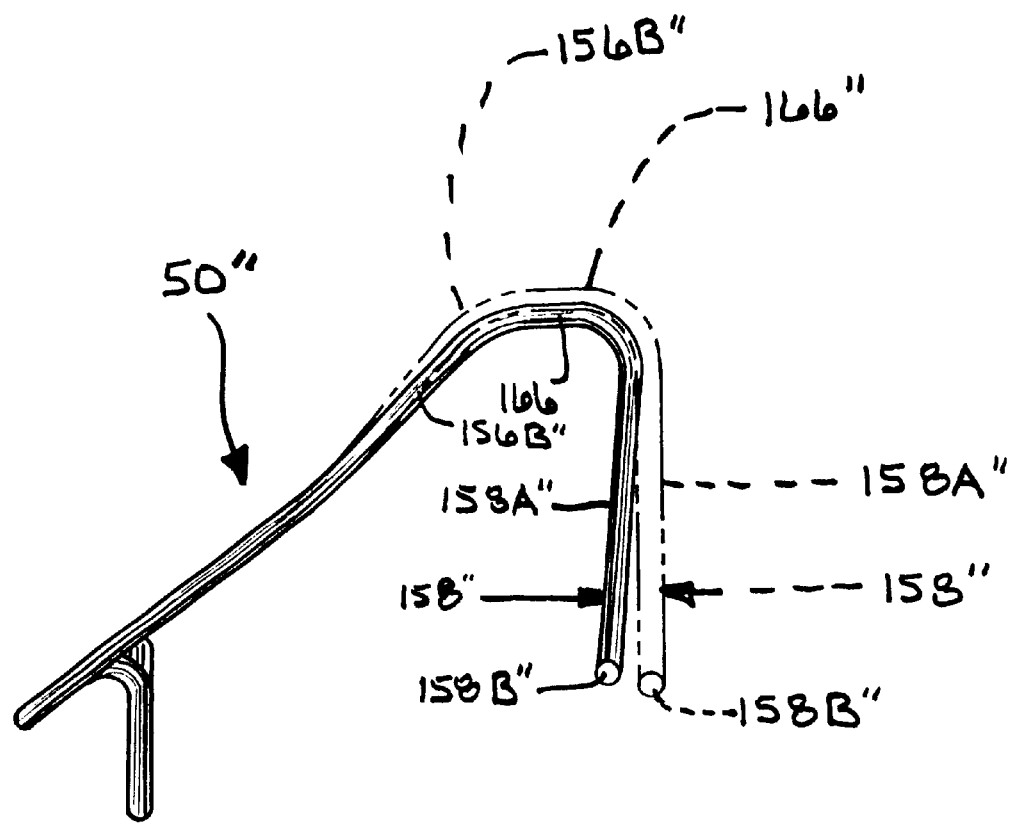
FIG. 10 is view of a third embodiment of a pad retraction spring in accordance with the present invention.

Turning now to FIG. 10 and using like reference numbers to indicate corresponding parts, there is illustrated a third embodiment of a pad retraction spring 50" in accordance with the present invention. In this embodiment, the spring 50" is similar to the spring 50 except that in the installed position the spring 50" is operative to apply a predetermined downward biasing force to the associated brake shoes 18 and 20. To accomplish this in this embodiment, portions 56B" and 156B" of arms 56" and 156", respectively, and the arms 58" and 158" (only arms 156" and 158" being shown in FIG. 10), are formed as shown in phantom and exaggerated for illustration purposes only, so that in the installed position (shown in solid), the spring 50" is operative to apply a predetermined generally downward biasing force to the brake shoes to prevent rattling. Alternatively, the spring 50" could be configured so as to apply a predetermined generally upward biasing force to the brake shoes.

Figure 11:
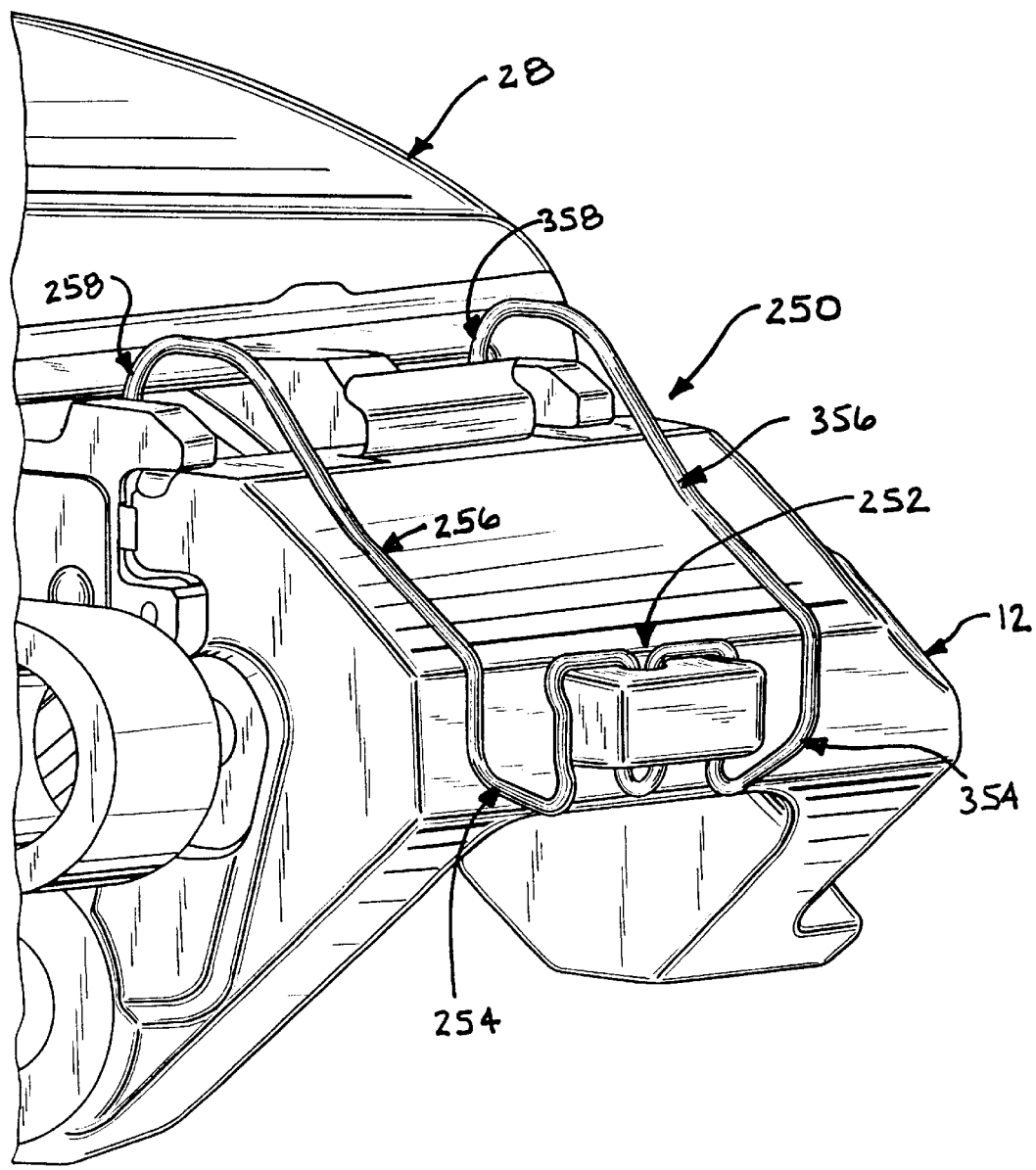
FIG. 11 is a perspective view of a portion of a vehicle disc brake assembly including a fourth embodiment of a pad retraction spring in accordance with this invention.

FIG. 11 illustrates a fourth embodiment of a pad retraction spring, indicated generally at 250, in accordance with the present invention. In this embodiment, the spring 250 includes a central mounting portion, indicated generally at 252, a first pair of spring arms 254 and 354, a second pair of spring arms 256 and 356, and a third pair of spring arms 28 and 358.

Figure 12:
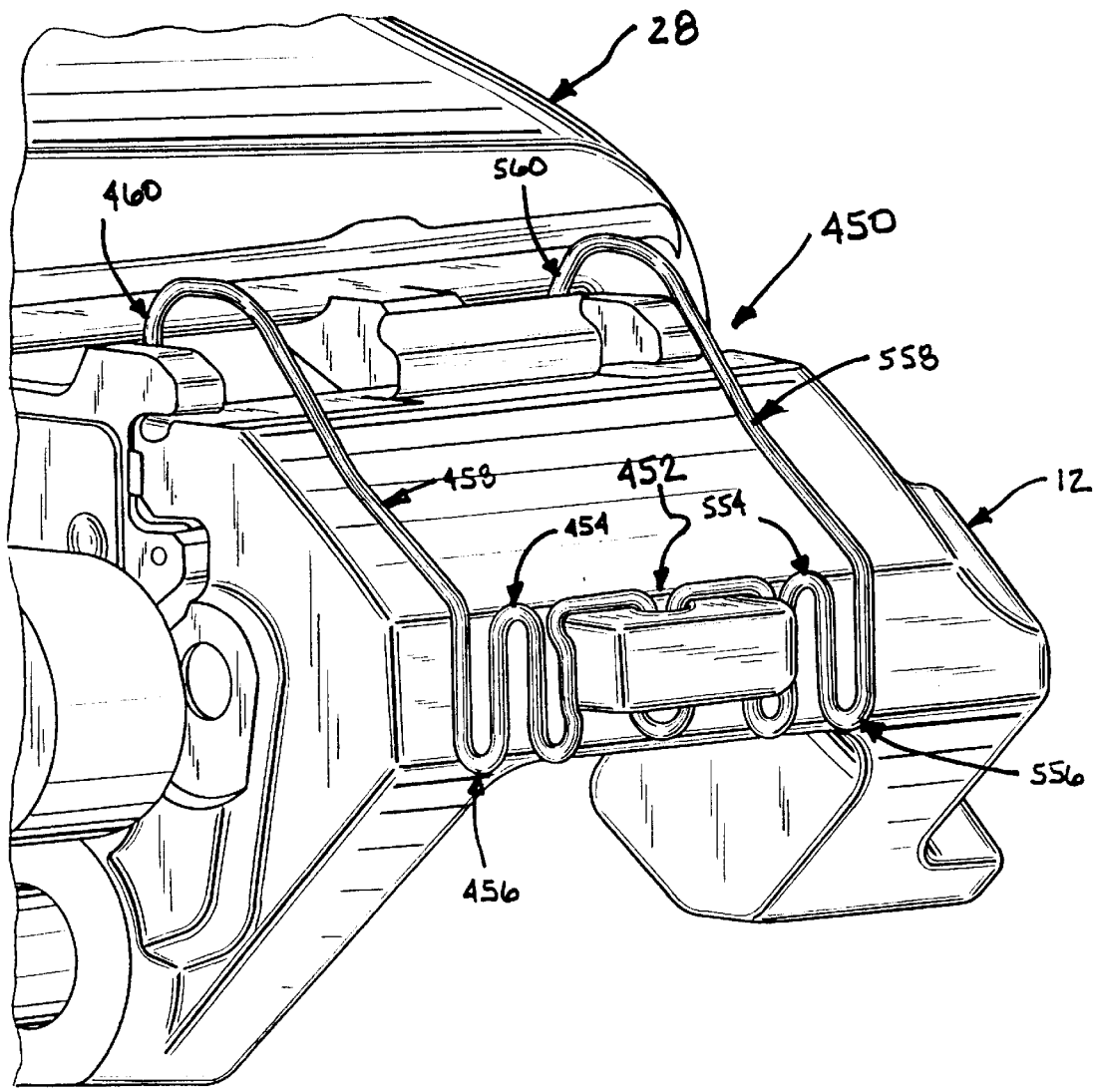
FIG. 12 is a perspective view of a portion of a vehicle disc brake assembly including a fifth embodiment of a pad retraction spring in accordance with this invention.

FIG. 12 illustrates a fifth embodiment of a pad retraction spring, indicated generally at 450, in accordance with the present invention. In this embodiment, the spring 450 includes a central mounting portion, indicated generally at 452, a first pair of spring arms 454 and 554, a second pair of spring arms 456 and 556, a third pair of spring arms 458 and 558, and a fifth pair of spring arms 460 and 560.

Figure 13:
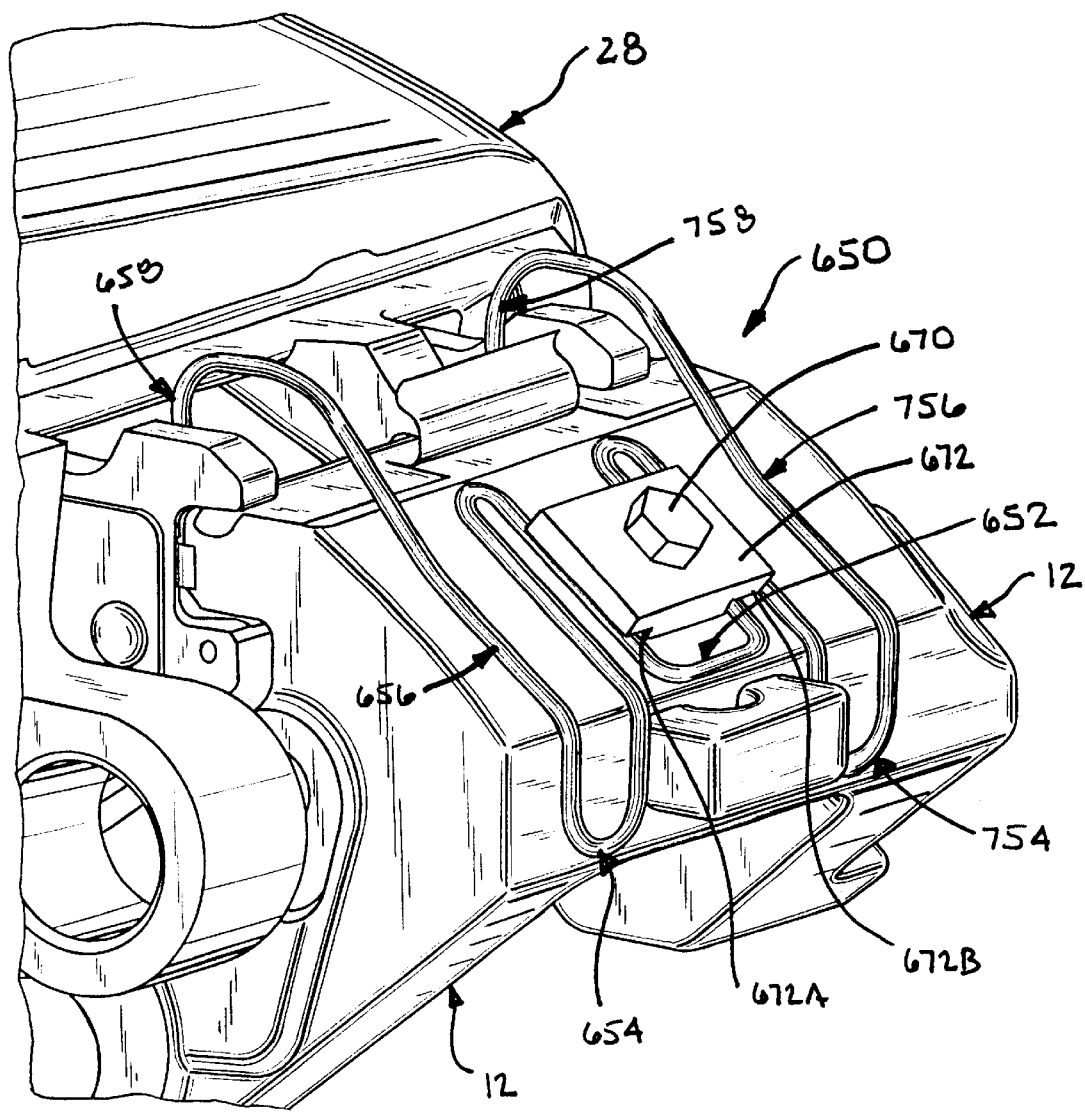
FIG. 13 is a perspective view of a portion of a vehicle disc brake assembly including a sixth embodiment of a pad retraction spring in accordance with this invention.

FIG. 13 illustrates a sixth embodiment of a pad retraction spring, indicated generally at 650, in accordance with the present invention. In this embodiment, the spring 650 includes a central mounting portion, indicated generally at 652, a first pair of spring arms 654 and 754, a second pair of spring arms 656 and 756, and a third pair of spring arms 658 and 758. Also, as shown therein, the central mounting portion 652 is supported on and secured to the associated arm of the anchor bracket 12 via a fastener 670 and a mounting plate 672. In the illustrated embodiment, the fastener 670 is a threaded bolt and the plate 672 has a pair of opposed end notches 672A and 672B for receiving and capturing a portion of the spring 650 when the fastener 670 is tightened.

Figure 14:
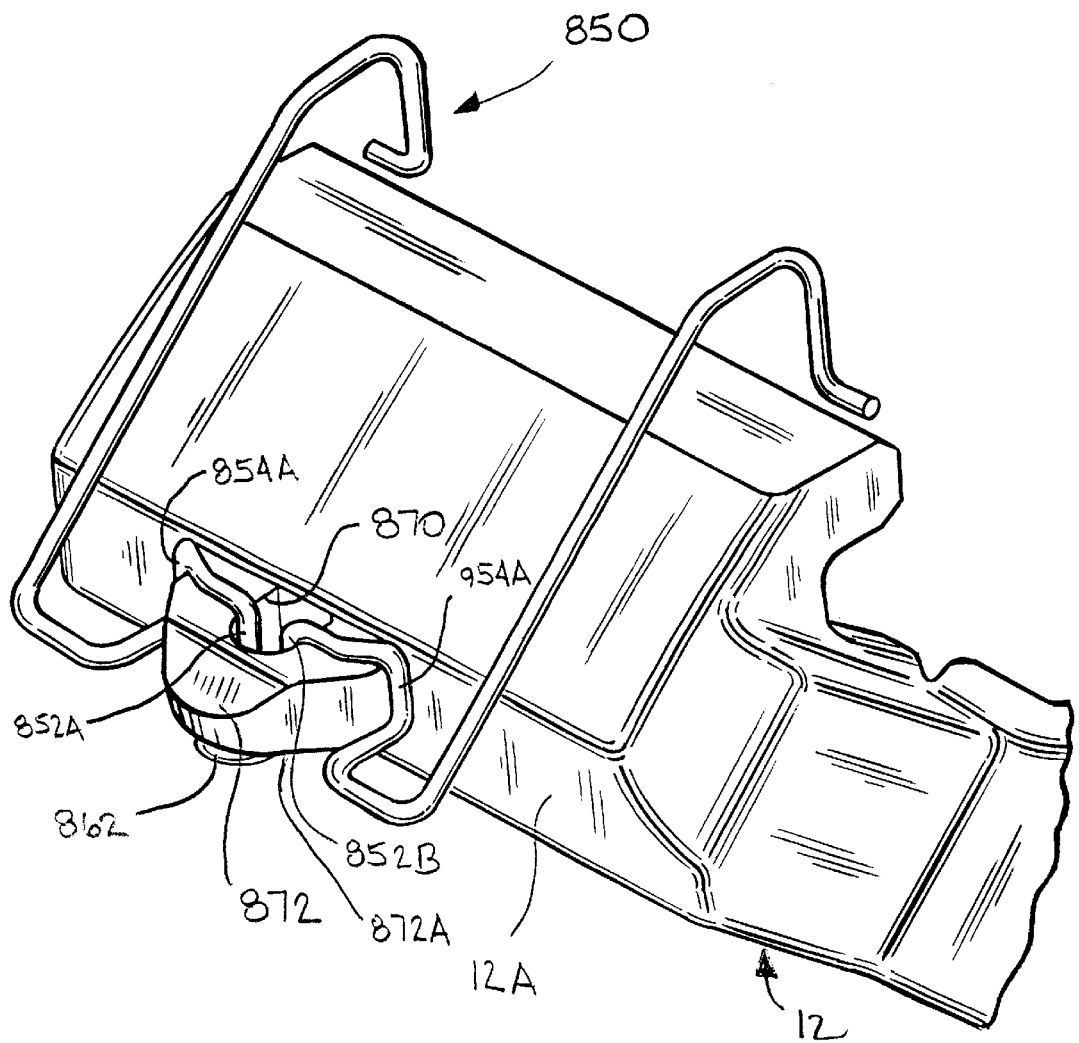
FIG. 14 is a perspective view of a portion of a vehicle disc brake assembly including a seventh embodiment of a pad retraction spring in accordance with this invention.
Figure 15:
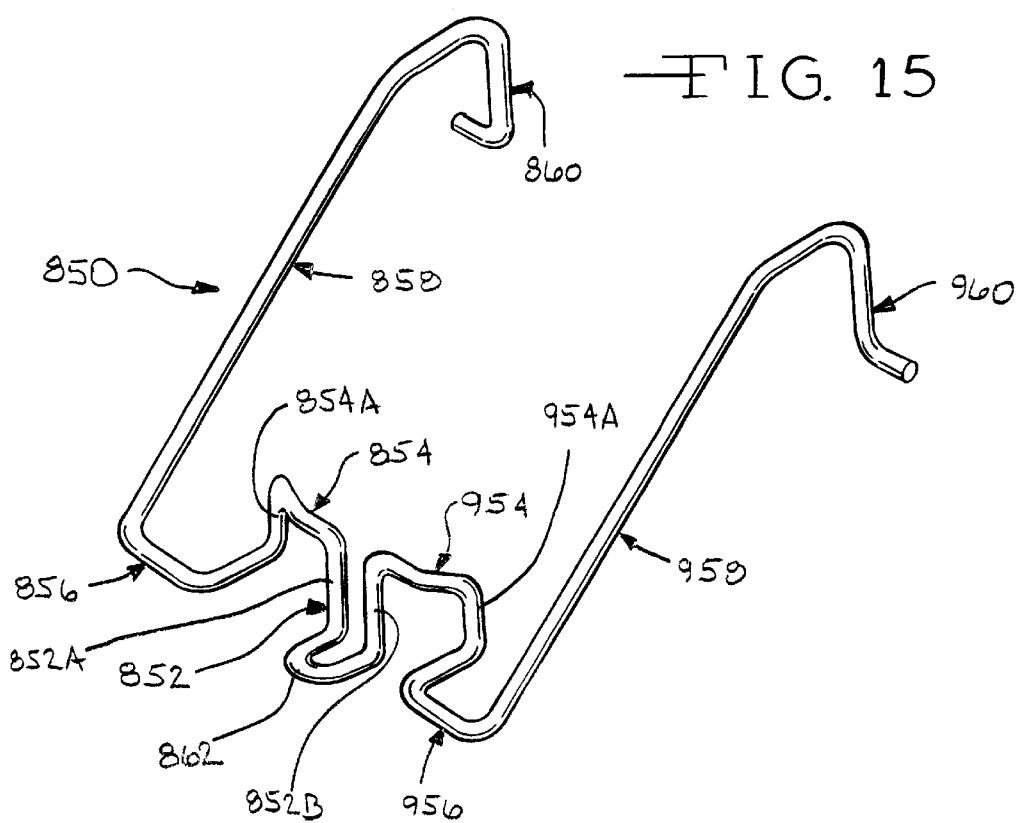
FIG. 15 is a perspective view of the pad retraction spring illustrated in FIG. 14.
Figure 16:
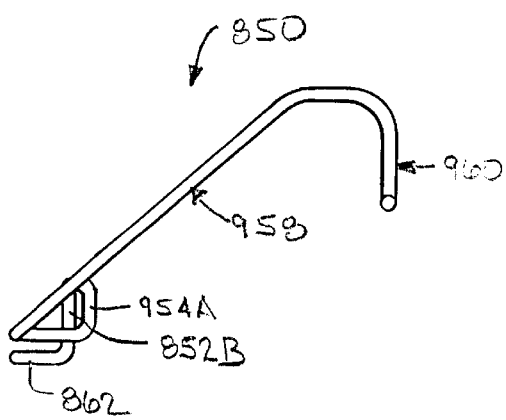
FIG. 16 is a side view of the pad retraction spring illustrated in FIGS. 14 and 15.

FIGS. 14–16 illustrate a seventh embodiment of a pad retraction spring, indicated generally at 750, in accordance with the present invention. In this embodiment, the spring 850 includes a central mounting portion, indicated generally at 852, a first pair of spring arms 854 and 954, a second pair of spring arms 856 and 956, a third pair of spring arms 858 and 958, and a fourth pair of spring arms 860 and 960. Also, as shown therein, the central mounting portion 852 includes portions 852A and 852B, and the arms 854 and 954 include respective portions 854A and 954A which are offset relative to portions 852A and 852B. As a result of this, the portions 852A and 852B are operative to abut a surface of an opening 870 provided in a lug 872 to bias the mounting portion 852 in a first direction, and the portions 854A and 954A are operative to abut an associated adjacent surface 12A of the anchor bracket 12 to bias the mounting portion 852 in a second direction which is opposite to the first direction so as to prevent movement of the mounting portion 852 of the pad retraction spring 850 and thereby maintain the mounting portion 852 in a fixed position relative to the brake rotor (not shown). Also, the mounting portion 852 of the pad retraction spring 850 includes an extension 862 which abuts a bottom or lower surface 872A of the lug 872.

While the present invention has been illustrated and described in connection with a "sliding" caliper type of disc brake assembly, the invention may be used with other disc brake assemblies. For example, the invention may be used in connection with a "fixed" caliper type of disc brake assembly (not shown). When used on a fixed caliper disc brake assembly, the retraction mechanisms can be supported on and secured to the brake caliper (not shown).

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising:
   an anchor bracket adapted to be secured to a vehicle component;
   a brake caliper adapted to be secured to said anchor bracket;
   an inboard friction pad and an outboard friction pad carried by said disc brake assembly and adapted to be disposed on opposite axial sides of an associated brake rotor;
   actuation means for selectively moving said inboard and outboard friction pads into frictional engagement with the rotor; and
   a pad retraction spring carried by said disc brake assembly for moving said friction pads from engagement with the rotor when said friction pads are in a non-braking position, said pad retraction spring effective to apply a first force against said friction pads when said friction pads are new, and effective to apply a second force against said friction pads when said friction pads are worn, said second force being greater than said first force;
   wherein at least one of said first force and said second force by itself is not sufficient to move at least one of said friction pads from engagement with the rotor when said friction pads are in said non-braking condition.

2. The disc brake assembly defined in claim 1 wherein said pair of friction pads includes an inboard friction pad and an outboard friction pad, and said first force by itself is not sufficient to move said outboard friction pad from engagement with the rotor when said friction pads are said non-braking condition.

3. The disc brake assembly defined in claim 1 wherein said pair of friction pads includes an inboard friction pad and an outboard friction pad, and said second force by itself is not sufficient to move said outboard friction pad from engagement with the rotor when said friction pads are said non-braking condition.

4. The disc brake assembly defined in claim 1 wherein said pad retraction spring includes a mounting portion which is attached to said anchor bracket in a fixed position relative to said brake rotor.

5. The disc brake assembly defined in claim 4 wherein said anchor bracket includes a lug having an opening and said mounting portion of said pad retraction spring is disposed in said lug.

6. The disc brake assembly defined in claim 5 wherein a first portion of said mounting portion of said pad retraction spring contacts said lug to bias said first portion of said mounting portion in a first direction and a second portion of said mounting portion of said pad retraction spring contacts said anchor bracket to bias said second portion of said mounting portion in a second opposite direction so as to prevent movement of said mounting portion of said pad retraction spring and thereby maintain said mounting portion in a fixed position relative to said brake rotor.

7. The disc brake assembly defined in claim 1 wherein said pad retraction spring includes at least a first pair of spring arms, said friction pads including an aperture the formed therein, and said springs arms are disposed in said apertures to operatively connect said pad retraction spring to said friction pads.

8. The disc brake assembly defined in claim 1 wherein said anchor bracket includes an aperture formed therein and said mounting portion of said pad retraction spring is secured to said anchor bracket by a fastener which extends through said mounting portion and is received in said aperture.

9. The disc brake assembly defined in claim 1 wherein each of said friction pads includes a backing plate and a friction pad, said backing plate includes an aperture formed therein, and remote ends of said arms of said pad retraction are disposed in said apertures of said backing plate to operatively connect said pad retraction spring to said friction pads.

10. The disc brake assembly defined in claim 1 wherein each of said friction pads includes a backing plate and a friction pad, and remote ends of said arms of said pad retraction abut a portion of said backing plate to operatively connect said pad retraction spring to said friction pads.

11. The disc brake assembly defined in claim 1 wherein said pad retraction spring has a spring rate which is in the range from about 0.40 N/mm to about 0.70 N/mm.

12. The disc brake assembly defined in claim 1 wherein said pad retraction spring is operative to apply a predetermined downward biasing force to said friction pads.

13. The disc brake assembly defined in claim 1 wherein said pad retraction spring is operative to apply a predetermined upward biasing force to said friction pads.

14. A pad retraction spring adapted for use in a disc brake assembly comprising:

a pad retraction spring adapted to be carried by the disc brake assembly for moving a pair of friction pads from engagement with a rotor when the friction pads are in a non-braking position, said pad retraction spring effective to apply a first force against the friction pads when the friction pads are new, and effective to apply a second force against the friction pads when the friction pads are worn, said second force being greater than said first force, wherein at least one of said first force and said second force by itself is not sufficient to move at least one of the friction pads from engagement with the rotor when the friction pads are in the non-braking condition.

15. The pad retraction spring, defined in claim 14 wherein said first force by itself is not sufficient to move at least one of the friction pads from engagement with the rotor when the friction pads are the non-braking condition.

16. The pad retraction spring defined in claim 14 wherein said second force by itself is not sufficient to move at least one of the friction pads from engagement with the rotor when the friction pads are the non-braking condition.

17. The pad retraction spring defined in claim 14 wherein said pad retraction spring has a spring, rate which is in the range from about 0.40 N/mm to about 0.70 N/mm.

18. A pad retraction spring adapted for use in a disc brake assembly comprising:

a pad retraction spring adapted to be carried by the disc brake assembly for moving a pair of friction pads from engagement with a rotor when the friction pads are in a non-braking position, said pad retraction spring including a mounting portion having a first portion and a second portion which is offset relative to said first portion, said first portion of said mounting portion of said pad retraction spring adapted to contact a lug provided on the anchor bracket to bias said first portion of said mounting portion in a first direction and said second portion of said mounting portion of said pad retraction spring adapted to contact the anchor bracket to bias said second portion of said mounting portion in a second opposite direction so as to prevent movement of said mounting portion of said pad retraction spring and thereby maintain said mounting portion in a fixed position relative to the brake rotor, said pad retraction spring effective to apply a first force against the friction pads when the friction pads are new, and effective to apply a second force against the friction pads when the friction pads are worn, said second force being greater than said first force, wherein at least one of said first force and said second force by itself is not sufficient to move at least one of the friction pads from engagement with the rotor when the friction pads are in the non-braking condition.

19. The pad retraction spring defined in claim 18 wherein said pad retraction spring has a spring rate which is in the range from about 0.40 N/mm to about 0.70 N/mm.

20. The pad retraction spring defined in claim 18 wherein said first force by itself is not sufficient to move at least one of the friction pads from engagement with the rotor when the friction pads are the non-braking condition.

21. The pad retraction spring defined in claim 18 wherein said second force by itself is not sufficient to move at least one of the friction pads from engagement with the rotor when the friction pads are the non-braking condition.

* * * * *